Aug. 30, 1949.
G. E. WHITE
PULSE RECEIVER SYSTEM FOR
IMPROVED TARGET TRACKING
2,480,171
Filed Feb. 18, 1943
2 Sheets-Sheet 1
Fig. 1.
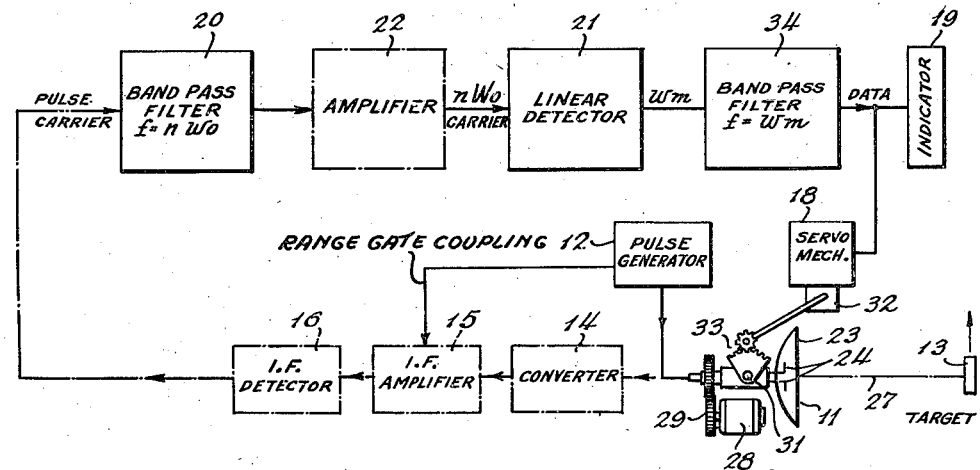
Fig. 2.
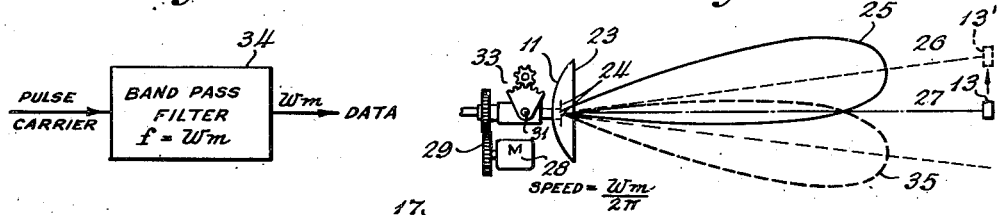
Fig. 4.
Fig. 3.
PRIOR ART
Fig. 5.
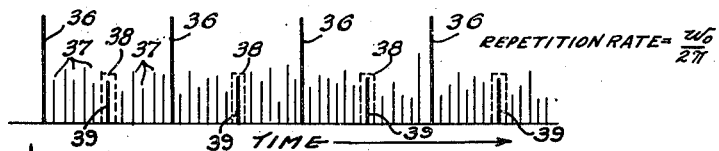
Fig. 6.
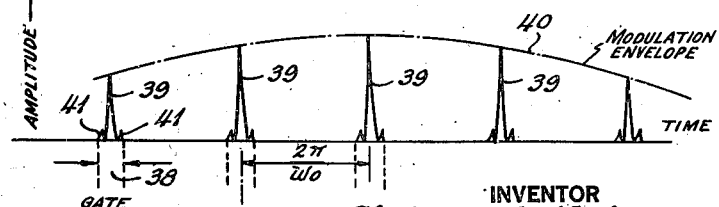
INVENTOR
Gifford E. White
BY
ATTORNEY Aug. 30, 1949.

G. E. WHITE 2,480,171

PULSE RECEIVER SYSTEM FOR
IMPROVED TARGET TRACKING

Filed Feb. 18, 1943

INVENTOR
Gifford E. White
BY
/ATTORNEY

Patented Aug. 30, 1949

2,480,171

UNITED STATES PATENT OFFICE 2,480,171

PULSE RECEIVER SYSTEM FOR IMPROVED TARGET TRACKING

Gifford E. White, Hempstead, N. Y., assignor to The Sperry Corporation, a corporation of Delaware Application February 18, 1943, Serial No. 476,355

6 Claims. (Cl. 343—7)

1

My invention relates to reception circuits and concerns particularly methods and apparatus for detection of microwave pulses.

It is an object of my invention to increase the ratio of signal-to-noise in pulse receivers and to improve the operation of servo systems and range indicators operated through such pulse receivers.

Other and further objects and advantages will become apparent as the description proceeds.

Scanning, target-following, and range-measuring systems have been devised in which microwave radio frequency energy is projected from a radiator in pulses at a suitable repetition rate, such as 2,000 cycles per second, for example. The microwave energy may have a frequency as high as 3,000 megacycles, for example, with a pulse duration of the order of a microsecond. If the projected beam of radiant energy intercepts a target, pulses are reflected. A receiver is provided which is responsive to the reflected pulses and thus detects the presence of a target. Means operated by the receiver may be provided for causing the microwave projector to track or follow the target. In one system for tracking the target, the radiator is caused to spin about an axis of rotation making a small angle with the axis of the radiator along which the beam of radiant energy is projected. The radiator is highly directive. Accordingly, when the spin axis of the radiator points toward the target, the strength will be uniform, whereas, when the spin axis is deflected slightly away from the target, the strength of the reflected signals will be modulated at the frequency of rotation of the projector around the spin axis. This frequency may be of the order of 20 cycles per second in some systems.

In order to cause the spinning radiator and associated indicating and control devices to track the target, a servo mechanism is employed which must be operated by the microwave pulse receiver. Heretofore, the reflected signal pulses provided in the receiver video amplifier circuit (an amplifier following the superheterodyne second detector and having a band width extending much higher than the usual audio frequency band width to retain pulse sharpness in its output) have been supplied to a peak voltmeter-type detector employed to provide a low-frequency alternating voltage wave of much higher energy content than that of the pulses themselves, and the output of the peak voltmeter-type detector has been further amplified and supplied to the system. The servo system operated according to these signals, which it compared in phase with the phase of rotation of the antenna about the spin axis, readjusting the antenna spin axis direction as required to follow the target.

Such a system of tracking in reliance on a radar system is described more fully in vol. 1, pages 47 and 366–369, and Figs. 1–14 and 17–24 of "Microwave radar" by Donald G. Fink, published by Radiation Laboratory, Massachusetts Institute of Technology, July, 1942.

The system described above, while operative and accurate under favorable noise conditions, is limited as to the range at which targets can be tracked for a given transmitter power and antenna directivity, because of its susceptibility to noise interference. In accordance with a major feature of my invention, the video output of the receiver is supplied to the input circuit of a band-pass filter of such character as to pass, at most, the fundamental or a harmonic of the pulse repetition frequency (i. e., an integral multiple thereof), together with the next adjacent side band frequency component or components of the video energy. This selected group of frequency components is then amplified and applied to a linear detector rather than a peak voltmeter-type detector, and the output of the linear detector, further amplified and filtered if desired by a band-pass filter for the spin modulation frequency, is utilized by the servo mechanism. An appreciably better signal-to-noise performance is obtainable in this way than heretofore achieved with the diode peak voltmeter-type detector operating directly on the video pulses.

In view of the fact that the reflected-signal video pulses are of uniform height when the antenna is aimed directly toward a reasonably nearby target, and are of undulating height when the spin axis is somewhat divergent from the target direction, these video pulses have the character of a carrier wave of pulsed wave form, which at times is modulated and at other times is of unmodulated character. Accordingly, I employ the term "pulse carrier" herein to refer to the video pulse wave corresponding to energy reflected from the target, this wave being modulated when the spin axis is divergent from the target direction.

A better understanding of my invention will be afforded by the following detailed description considered in connection with the accompanying drawings, and those features which are believed to be novel and patentable will be pointed out in the claims appended thereto.

In the drawings,

Fig. 1 is a block diagram of a microwave pulse system employing one embodiment of my invention.

Fig. 2 is a fragmentary block diagram of another embodiment of the apparatus of Fig. 1.

Fig. 3 is a fragmentary block diagram representative of a method of detection and reception which has been employed heretofore.

Fig. 4 is a schematic diagram of a radiator such as may be used in microwave pulse systems, showing the characteristic radiation pattern of such a system.

Fig. 5 is a graph representing the pulse carrier produced in a microwave pulse system representing transmitted and reflected pulses with the amplitudes plotted in a vertical direction spaced along a horizontal time axis, spin frequency modulation not being indicated.

Fig. 6 is a graph representing the result of modulation of a pulse carrier by a spinning radiator and also representing the result of selection of predetermined reflected pulses by the use of a narrow time gate.

Like reference characters are used throughout the drawings to designate like parts.

Figure 7:
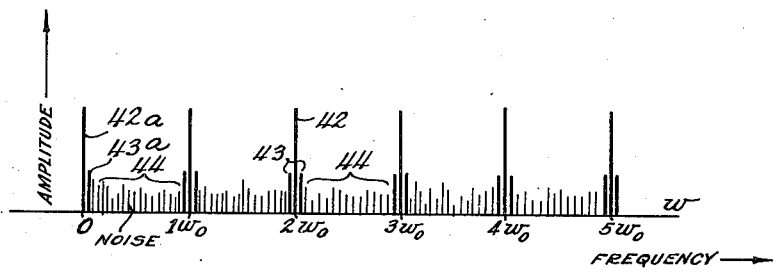
Fig. 7 is a graph representing an analysis of a pulse carrier such as shown in Fig. 6, showing the amplitudes of various frequency components, the amplitude being plotted in the vertical direction and the frequency in a horizontal direction.
Figure 8:
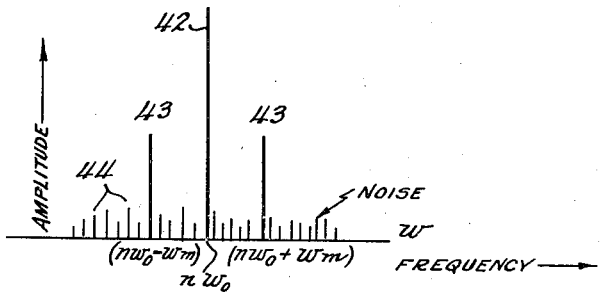
Fig. 8 is a graph corresponding to Fig. 7 on an enlarged scale, representing the components of the pulse carrier within a given frequency band.

My improved reception and detection system is illustrated as used in connection with a target locating and tracking system employing a microwave projector. Such systems, as illustrated in Fig. 1, may comprise a radiator 11 with a pulse generator 12 for energizing the radiator to produce a beam of pulses which will be reflected and received again by the radiator 11 if the pulses are intercepted by the presence of a target 13 along the axis of the radiator 11. To facilitate amplification and reception of the received or reflected pulses, a converter 14 is ordinarily provided which reduces the frequency of the microwave received energy. An intermediate frequency amplifier 15 may be provided with a detector referred to as intermediate frequency detector 16 for converting the received microwave energy into a pulse carrier or a succession of electrical pulses having the same repetition rate as the pulse generator 12.

The pulse carrier emerging from the intermediate frequency detector 16 may be applied to a diode peak voltmeter type of low-frequency detector 17, as represented in Fig. 3, in accordance with the prior art, and various types of devices, such as a servo mechanism shown at 18 in Fig. 1, may be connected to the output side of the detector 17 for operation by a wave which has a modulation frequency corresponding to the spinning speed of the radiator 11. A suitable indicating device such as an oscilloscope 19 may also be connected to the output of the detector 17. The output wave from the detector 17 contains the desired data which are to be supplied to the responsive devices such as 18 or 19.

In contradistinction to the prior art, I interpose a band-pass filter 20 between the source of the pulse carrier and the output devices such as the indicator 19 or the servo mechanism 18, and I interpose a linear detector 21 between the band-pass filter 20 and the devices 18 and 19. If desired, an amplifier 22 may be interposed between the band-pass filter 20 and the linear detector 21.

The radiator 11, shown in greater detail in Fig. 4, may comprise a paraboloid 23 with a dipole antenna 24 mounted thereon for projecting the radio frequency energy in a narrow beam represented by the radiation pattern 25 having an axis 26 corresponding to the axis of the paraboloid 23. The paraboloid 23 may be provided with scanning motion for sweeping the beam 25 in order to locate a target. However, my invention is concerned principally with the use of such a radiator in connection with tracking a target. For this purpose the paraboloid 23 is so mounted, as represented schematically in Fig. 4, that it may rotate about a spin axis 27, being driven about this axis by a suitable device such as a motor 28 geared or belted to a rotatable support 29. The arrangement is such that the axis 26 of the radiated beam 25 makes a relatively small angle with the spin axis 27. In order to track a moving target, means are provided for deflecting the spin axis 27. Such means are represented schematically in Fig. 1 by an oscillating mounting 31. For changing the angle of the spin axis, suitable means such as a motor 32 and a pinion and gear segment linkage 33 are provided. The motor 32 is so connected to the servo mechanism 18 as to be controlled thereby in order that the tracking will take place in response to variations in the signals in the pulse carrier detected by the detector 21.

The filter 20 is designed to pass with minimum attenuation signals having the same frequency as the repetition frequency of the pulses generated by the pulse generator 12 and picked up by the radiator 11. Alternatively, the filter 20 may be designed for a pass frequency which is a multiple of the pulse repetition frequency. The pulse repetition frequency is represented by the symbol $\omega_0$, and the pass-frequency of the filter 20, by the symbol $n\omega_0$.

If desired, a band-pass filter 34 may be interposed between the linear detector 21 and the output responsive devices 18 and 19. The filter 34 has a pass-band for the spin frequency of the radiator.

Referring to Fig. 4, as the paraboloid 23 is rotated about its spin axis 27, the radiated beam 25 is rotated describing a cone. At different angular positions of the rotating beam 25 the maximum radiation will be along different elements of the cone. The projection pattern for the radiator position 180° from that corresponding to the projection pattern 25 is in accordance with the projection pattern 35 shown in dotted lines in Fig. 4. It will be understood that the paraboloid 23 is directive both with respect to transmission, and also with respect to the reception of reflections of such pulses in case a target is present and pulses are reflected. Accordingly, if the target 13 is along the spin axis 27, the strength of the pulse carrier picked up by the receiver will not be varied by the rotation of the paraboloid 23. However, if the spin axis 27 should not be aligned toward the target 13, or the position of the target 13 should be changed to the position 13′ in which the target is represented by dotted lines, the strength of the reflected wave will vary in accordance with the angular position of the paraboloid 23 about its spin axis 27.

The variation in strength will be cyclical with a rate of undulation corresponding to the speed of rotation of the paraboloid 23. Thus, a modulation of the same frequency will be imposed on the pulse carrier. The frequency of this modulation is represented by the symbol $\omega_m$. The servo mechanism 18 is so constructed as to be responsive to the strength of the modulation at this frequency, namely, the spin frequency, and is designed to rotate the motor 32 and deflect the spin axis 27 in such a direction as to reduce the strength of the modulation, thereby causing the spin axis 27 to be directed toward the target 13. In this manner the apparatus is caused to track the target.

The manner in which unwanted signals or noise are eliminated from the receiver output, from the input to the servo mechanism 18 and from the indicator device 19 will be better understood from a consideration of the nature of the pulse carrier.

In the conventional pulsed microwave type of locator and navigational systems, there are generally several different carrier frequencies recognizable in the system which have a pulse modulation envelope. For instance, the commonly emitted signal is a train of microwave signals each about a microsecond long. Then in the converter 14 and the intermediate frequency amplifier 15 each train of microwave oscillations is converted into a train of oscillations at the intermediate frequency, forming a train of approximately 30 cycles in the case of a 30-megacycle mid-frequency in the intermediate frequency channel. Finally, the intermediate frequency oscillations are detected in the intermediate frequency detector 16 and appear in the receiver circuits as only a modulation envelope, which may be regarded as a zero frequency carrier with the same side bands as before. This latter envelope is referred to as a pulse carrier in the present application, and this latter use of the phrase is justified by the fact that the amplitudes of the pulses are modified by certain signals, both useful and harmful, which must be handled by the receiving apparatus. These modifying signals are usually modifying factors for the envelopes of the pulses. The object of the receiver is the recovery of the desired modulation factors and the elimination of undesired modulation factors or noise.

The problem of the isolation of desired information or modulations from the extraneous noise may be approached from two standpoints, namely, from the standpoint of time and that of frequency. Time is an essential factor because in range-measuring apparatus it is necessary to determine the transmission time of the range signals. A single signal or group of signals may be isolated in time by the use of a gating circuit synchronized with the transmitting signal. Thus, the signal-to-noise ratio may be improved by applying a narrow gate to the receiver which is centered on the wanted signal.

For example, as illustrated in Fig. 5, the transmitted pulses may be represented by the larger and the heavier vertical lines 36. These pulses may, for example, have a time duration of about a microsecond each and a repetition rate of about 2,000 cycles per second. In this case the pulses 36 will be spaced 500 microseconds apart. The system is not, however, limited to any given repetition rate and the repetition rate in pulses per second is represented symbolically by the symbol $$\frac{\omega_0}{2\pi}$$

or by the symbol, $\omega_0$, when expressed in radians per second. Various targets at different distances from the radiator 11 will give rise to reflected pulses 37 which will follow the transmitted pulses 36 with different time delays depending upon the transmission time of the reflected pulse. In order to eliminate pulses from undesired targets and also to eliminate any noise or extraneous signals which may be picked up, the so-called "narrow gate" represented in Fig. 5 by the dotted rectangle 38 may be provided for making the receiver unresponsive except during a predetermined time interval following each of the transmitted pulses 36.

Range gating usually is accomplished by shifting the intermediate frequency amplifier between a non-responsive condition and a responsive condition as in response to the pulse generator, as indicated schematically in Fig. 1, and as fully shown and described in the textbook Microwave Radar, by Donald G. Fink, published in 1942.

The details of the mechanism for producing this narrow range gate are not illustrated in the drawings and do not themselves constitute a part of my present invention. However, Figs. 1 and 5 illustrate the time approach for increasing signal-to-noise ratio in the reception of the reflected pulses 39. Various types of gate circuits or trigger circuits with square wave output (also called square wave generators) are described and illustrated in Basic Radio, by Hoag, published in 1942. For example, Fig. 30 I and section 30.8 on page 235, also sections 30.2, 30.3 and 14.8. Such circuits are also disclosed in Ultra High Frequency Techniques, edited by J. G. Brainerd, published in 1942, Chapter IV, especially section 4–9 on page 182; sections 4–5 and 4–6 on page 176. The multivibrator type of moving gate generator for triggering a range gate or narrow gate to cut down the noise in a radio pulse receiver is shown at 122 in Fig. 18 of the copending application of Robert F. Mozley, Serial No. 482,807, filed April 12, 1943. Arrangements for gating a receiver are also described in the copending application of W. H. Ratliff, Jr., Serial No. 499,916, filed August 25, 1943, now abandoned, referring particularly to elements 24 and 29, and in the copending application of Daniel S. Pensyl, Serial No. 476,357, filed February 18, 1943 issued April 27, 1948 as Patent No. 2,440,289, both assigned to the same assignee as the present application.

In the type of microwave system herein described, wherein the radiator 11 is caused to track a desired target 13, the effects are not transient, and the received pulse 39 occurs repeatedly at fixed intervals with the same repetition rate as the transmitted pulses 36. The strengths of successive received impulses are varied, however, according to the angular position of the radiator paraboloid 23. The variation in amplitude is represented in Fig. 6 with the variation in amplitude of each received pulse 39 represented by the modulation envelope 40. Extraneous noise outside the time periods of the narrow gates 38 is eliminated. It will be observed, however, that noise impulses 41 may occur together with the desired received pulses 39 during the time gate interval 38. In the apparatus described herein, the signal-to-noise ratio is made relatively large by substantially eliminating the effect of the noise impulses 41 passed by the gate circuit.

Since the series of pulses 39 is very large in number, an analysis of the wave representing the repeated pulses 39 includes a large number of different frequency components. Thus, if the spacing between pulses is the time interval $$\frac{2\pi}{\omega_0}$$

various components will exist in a wave as represented by Fig. 7, each component being separated from the next by the frequency $\omega_0$. For simplicity the different components are shown with the same amplitude in Fig. 7, since their amplitudes differ imperceptibly in the case of short pulses. Thus there will be a zero frequency or direct current component, and various other components at the frequency $\omega_0$, $2\omega_0$, $3\omega_0$, and so on indefinitely. Owing to the fact that the amplitudes of the pulses 39 are not uniform but vary, modulation side bands will be produced, that is to say, a second frequency is superimposed resulting in side band frequencies above and below the successive frequencies $1\omega_0$, $2\omega_0$, $3\omega_0$, and so forth, as shown in Fig. 7. These principal frequencies are represented in Fig. 7 by the vertical lines 42. The side bands resulting from the desired modulation are represented by the vertical lines 43. However, the presence of extraneous signals in the reception by the radiator 11 will result in additional modulations or noise represented by groups of vertical lines 44.

The noise modulations 44 may be eliminated by passing the pulse carrier through a filter network which passes the various frequencies 42 with pass bands wide enough to include only the frequency ranges represented by the desired side-band frequencies 43. However, there are theoretically an infinite number of frequencies 42 in the analysis of the pulse carrier, and, accordingly, a filter with an infinite number of pass bands corresponds to an infinite number of sections might appear to be required.

I have found, however, that it is not necessary to employ an infinite number of filter sections. As a matter of fact, a filter designed for passing any selected one of the frequencies $\omega_0$, $2\omega_0$, $3\omega_0$, and so forth, may advantageously be employed. Satisfactory results of the microwave receiver and apparatus operated thereby depend not primarily on the total amplitude of the desired signals but rather on the ratio of the desired signals to the extraneous signals or noise. If the requisite signal-to-noise ratio is obtained, suitable output amplitude may be obtained by amplification at a suitable point in the receiver. I have found that the signal-to-noise ratio is independent of the number of pass bands in the filter. Accordingly, as represented in Fig. 1, I employ a single pass-band filter 20 which has a pass band corresponding to either the repetition rate $\omega_0$ of the pulse carrier or some higher integral multiple thereof represented by the equation $f=n\omega_0$, when measured in radians per second.

Figure 9:
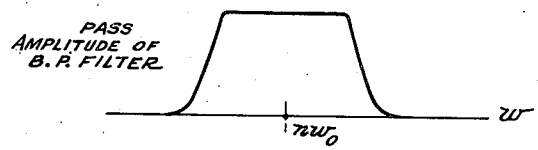
Fig. 9 is a graph representing the characteristic of the band-pass filter such as I employ in accordance with my invention, the pass amplitude being measured in a vertical direction and the frequency in a horizontal direction on the graph.

Selecting any one of the frequencies 42, as shown with an enlarged frequency scale in Fig. 3, it will be observed that the band-pass filter 20 of Fig. 1 should have a pass band wide enough to include the mid-frequency $n\omega_0$ and also the desired modulation side bands $(n\omega_0+\omega_m)$ and $(n\omega_0-\omega_m)$. Such a pass-band characteristic is represented in Fig. 9. The symbol $\omega_m$ represents the frequency in radians per second of the modulation envelope 40 shown in Fig. 6, that is, $2\pi$ times the number of rotations per second executed by the paraboloid 23 about the spin axis 27, referring to Fig. 4.

Figure 10:
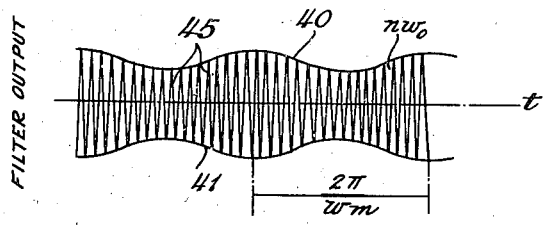
Fig. 10 is a graph illustrating the filter output plotted along a horizontal time axis.

The output of the pass-band filter 20 is represented in Fig. 10. It is seen to consist of an oscillatory wave consisting of oscillations 45 having a frequency $n\omega_0$ modulated by the envelope 40 which has the spin frequency modulation $\omega_m$.

If greater signal strength is desired, the amplifier 22 may be interposed immediately after the band-pass filter as shown in Fig. 1. The modulation envelope 40 is then recovered by the linear detector 21, and a low frequency signal having the desired spin frequency modulation $\omega_m$ emerges from the linear detector or demodulator 21. An additional band-pass filter having a pass frequency $f=\omega_m$ may be interposed immediately following the linear detector 21 to discriminate further against the portion of the noise spectrum admitted by filter 20.

Referring to Fig. 7, it will be seen that one of the components of the pulse carrier is a zero frequency component 42a. The first upper side band 43a is separated from the zero frequency component 42a according to the frequency of the modulation $\omega_m$. This may be accomplished as represented in Fig. 2 by applying the pulse carrier directly to a band-pass filter 34 having the pass frequency $f=\omega_m$. The output of the band-pass filter 34 may then be passed directly to the output-responsive devices such as 18 and 19 of Fig. 1. However, this necessitates amplifying at the spin frequency $\omega_m$ if any amplification is desired in addition to that provided by the intermediate frequency amplifier 15. Furthermore, I believe that in the case of the microwave frequency ordinarily employed and the intermediate frequency detectors available, the zero frequency carrier 42a has been rejected, and possibly even the $1\omega_0$ component may have been eliminated to a considerable extent from the pulse carrier. Accordingly, where weak signals may be encountered and an optimum signal-to-noise ratio is desired, I prefer to employ the arrangement of Fig. 1, where the band-pass filter 20 is employed, having a band-pass frequency equal to a multiple of the repetition frequency $\omega_0$, where the multiple is one or an integer more than one. For convenience in the description and claims, I use the phrase "multiple of the repetition frequency" to include the repetition frequency itself.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a microwave pulse radio object detection system for transmitting pulses of microwave energy at a predetermined pulse repetition frequency toward a remote object and receiving pulses of energy reflected therefrom to determine the position of said object, an object detection receiver comprising: means for amplifying and detecting energy received from said object, means including band-pass filter means coupled to said amplifying and detecting means for rejecting those frequency components of the detected signal appreciably removed from a selected harmonic of said pulse repetition frequency, and further detecting means coupled to said band-pass filter means for producing an output signal varying as the average strength of a series of received pulses.

2. In a microwave pulse radio object detection system for transmitting pulses of microwave energy at a predetermined repetition frequency toward a remote object and intercepting pulses of energy reflected therefrom to determine the position of said object, each successive intercepted energy pulse being spaced in time after a transmitted pulse by an interval proportional to the distance between said system and said object, radio receiving apparatus comprising: amplifying and detecting means responsive to said intercepted energy pulses for producing an output signal voltage varying abruptly according to time-variations of the average strength of the microwave energy intercepted, time-selective gating means responsive to transmitted pulses and operatively coupled to said amplifying and detecting means for limiting said output signal voltage to variations occurring during predetermined parts of the time intervals between successive pulses, frequency-selective means including a band-pass filter tuned to a predetermined multiple of said repetition frequency for discriminating against noise-signal components passed by said gating means, and rectifying means receiving the output of said frequency-selective means for providing an output voltage varying according to variation of the average strength of the intercepted energy pulses.

3. In a microwave pulse radio object detection and tracking system for transmitting pulses of microwave energy at a predetermined pulse repetition frequency toward a remote object and intercepting microwave energy pulses reflected therefrom, wherein the directivity of the radio object detection system is recurrently varied through a predetermined zone of directions at a frequency appreciably lower than said pulse repetition frequency in order to modulate the strength of the successive intercepted energy pulses in a manner indicative of the direction of said remote object relative to said predetermined zone, a receiver for providing an alternating output signal corresponding to the modulation of the strength of successive intercepted energy pulses, comprising: means for amplifying and detecting said intercepted microwave energy pulses for producing a pulse signal envelope, band-pass filter means coupled to said amplifying and detecting means and responsive to said pulse signal envelope for rejecting those components of the detected pulse signal envelope removed from a chosen multiple of said pulse repetition frequency by a frequency difference greater than said directivity variation frequency, and further detecting means coupled to said band-pass filter means for producing an alternating output signal of frequency and phase determined respectively according to said directivity variation frequency and to the direction of said object from said object detection system.

4. A receiver for providing an output voltage periodically varying according to undulations of strength of very short and widely separated recurrent pulses of microwave oscillations, comprising means for amplifying and detecting short, widely separated recurrent pulses of microwave oscillations to produce an undulating succession of voltage impulses, means coupled directly to said amplifying and detecting means for receiving said voltage impulses and transforming them into a substantially sinusoidal wave modulated in accordance with the undulations of strength of said impulses, and detecting means coupled to said frequency-selective means for rectifying said modulated wave to produce an alternating output wave representing said undulations.

5. A receiver for providing an output voltage periodically varying according to undulations of strength of very short and widely separated recurrent pulses of microwave oscillations, comprising means for amplifying and detecting short, widely separated recurrent pulses of microwave oscillations to produce an undulating succession of voltage impulses, frequency-selective means coupled to said amplifying and detecting means for passing the frequency of the undulations of said voltage impulses and rejecting all components of said voltage impulses of higher frequency than the frequency of said undulations, and utilization means responsive to the signal components passed by said frequency-selective means for suppressing said undulations.

6. In a radio object detection system, means including a directive antenna for sending widely spaced very short pulses of microwave energy recurrently to a distant object and intercepting microwave energy pulses reflected therefrom, means for periodically varying the direction of maximum signal strength of said antenna through a limited zone of directivity to produce periodic undulations of strength of said intercepted microwave energy pulses of phase and strength dependent upon the direction of said distant object relative to said zone of directivity, means for amplifying and detecting said undulated microwave energy pulses to produce an undulating succession of voltage impulses, frequency-selective means coupled to said amplifying and detecting means for passing a selected component of the output thereof modulated in accordance with said undulations and rejecting all other components of said output, and means responsive to the modulation of the signal passed by said frequency-selective means for varying the zone of directivity to maintain a predetermined relation between said zone and the direction of said distant object.

GIFFORD E. WHITE.

REFERENCES CITED

The following references are of record in the file of this patent:

UNITED STATES PATENTS

| Number | Name | Date |
|---|---|---|
| 2,071,733 | Curtis | Feb. 23, 1937 |
| 2,111,373 | Schaper | Mar. 15, 1938 |
| 2,112,065 | Braden | Mar. 22, 1938 |
| 2,113,214 | Luck | Apr. 5, 1938 |
| 2,115,676 | Wheeler | Apr. 26, 1938 |
| 2,116,502 | Armstrong | May 10, 1938 |
| 2,138,746 | Robinson | Nov. 29, 1938 |
| 2,153,780 | Van Loon | Apr. 11, 1938 |
| 2,168,874 | Lewis et al. | Aug. 8, 1939 |
| 2,169,830 | Case | Aug. 15, 1939 |
| 2,192,975 | Kotowski et al. | Mar. 12, 1940 |
| 2,225,524 | Percival | Dec. 17, 1940 |
| 2,232,833 | Wilhelm | Feb. 25, 1941 |
| 2,241,170 | Ulbricht | May 6, 1941 |
| 2,262,707 | Farrington | Nov. 11, 1941 |
| 2,266,401 | Reeves | Dec. 16, 1941 |
| 2,282,974 | Koch | May 12, 1942 |
| 2,354,749 | Griffin | Aug. 1, 1944 |
| 2,392,546 | Peterson | Jan. 8, 1946 |
| 2,416,328 | Labin | Feb. 25, 1947 |
| 2,416,895 | Bartelink | Mar. 4, 1947 |

FOREIGN PATENTS

| Number | Country | Date |
|---|---|---|
| 469,417 | Great Britain | July 26, 1937 |